United States Patent Office 2,925,430
Patented Feb. 16, 1960

2,925,430

POLYMERIC BASIC ALUMINUM COMPOUNDS OF ORGANIC ACIDS

Pieter L. Stedehouder and Wilhelmus J. C. Viveen, Deventer, Netherlands, assignors to Koninklijke Industrieele Maatschappij voorheen Noury & Van der Lande N.V., Deventer, Netherlands, a corporation of the Netherlands No Drawing. Application February 13, 1956
Serial No. 564,870

Claims priority, application Netherlands
February 18, 1955

10 Claims. (Cl. 260—414)

This invention relates to the prapartion of new polymeric basic aluminum salts of organic acids, of the general formula

[O=Al—X]$_n$ in which X stands for an organic acid radical and $n$ is a whole number. The invention also relates to the novel polymeric substances per se, as well as to certain uses therefor.

These new polymers have not heretofore been described in the literature. However, in Annali di Chimica 41, 807–813 (1951), G. Illari describes a basic aluminum benzoate of the formula O=Al—OCOC$_6$H$_5$, which was obtained by reacting a basic aluminum chloride of the formula Al(OH)Cl$_2$ first with phenol and thereafter with benzoic acid, thermally decomposing the aluminum hydroxy-phenoxy-benzoate (C$_6$H$_5$COOAl(OH)OC$_6$H$_5$)

thus formed by heating to 300° C., the latter product thereby being split into phenol and basic aluminum benzoate. The cited article does not mention whether the resulting compound, a faintly pink colored powder, is polymerized. The process as described by G. Illari is very cumbersome and the Al(OH)Cl$_2$ difficult to obtain, so that in any event manufacture on an industrial scale in that manner is not possible.

According to the present invention a general, simple process is provided for the manufacture of novel polymeric basic aluminum salts of organic acids of the general formula [O=Al—X]$_n$, this process being based on the reaction of basic aluminum salts of the formula (HO)$_2$Al—X with di-alkoxy aluminum salts (RO)$_2$Al—X' in which X and X' stand for the same or different organic acid radicals and R is an alkyl or aryl group. The reaction is preferably carried out in an inert organic solvent, such as xylene or mineral spirits, at an increased temperature, such as about 100–150° C. at which elevated temperature an alcohol is split off (1 mol of alcohol per atom of aluminum).

The formation of the polymer can be represented as follows:

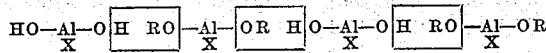

in which merely for the sake of convenience X and X' are assumed to be identical.

Basically, the formula approaches [O=Al—X]$_n$ in which an —OH and —OR group (respectively) are attached to the ends, unless cyclization has taken place. Because of the high value assumed by $n$, for example approximately 50–100, it is not possible to ascertain whether a single —OH and —OR group are present. Though X and X', considered broadly, are organic acid radicals, particularly interesting and important products are obtained with fatty acids (the lower as well as the higher fatty acids such as palmitic acid, stearic acid, oleic acid, etc.), with naphthenic acids and with rosin acids, or with mixtures thereof, for example tall oil. From practical considerations it is preferable to employ compounds in which R is a lower alkyl group, such as the ethyl-, propyl-, isopropyl-, butyl-, or amyl group, though the reactions involved herein also take place very satisfactorily with higher alkyl groups or aryl groups.

The di-alkoxy aluminum salts are obtained by reacting an aluminum tri-alcoholate with 1 mol of an organic acid, preferably in an inert organic solvent such as xylene and mineral spirits; during the reaction 1 mol of alcohol is liberated. In the case of fatty acids the formation of such solutions of di-alkoxy aluminum salts has been described in the literature.

The process of the present invention is carried out very conveniently such as for example by adding basic aluminum salt of the formula (HO)$_2$Al—X with stirring to a solution of di-alkoxy aluminum salt in xylene, this solution previously being heated to about 90° C. The basic aluminum salt may be added as such or in the form of a solution in a solvent such as xylene. In general, the reaction is completed by gradually increasing the temperature to approximately 140° C. The liberated lower alcohol may be readily distilled off.

A suitable method for obtaining pure basic aluminum salts of the formula (HO)$_2$Al—X is by treating a solution of a di-alkoxy aluminum salt with 2 mols of water per mol of di-alkoxy aluminum salt at an increased temperature, 2 mols of alcohol being thus liberated. The latter can be recovered if desired. The reaction is as follows:

(RO)$_2$Al—X + 2H$_2$O → (HO)$_2$Al—X + 2ROH

It is also possible to form the basic aluminum salt (HO)$_2$Al—X as an intermediate. In this event the reaction is carried out for example by adding water, at an elevated temperature and in the molar ratio of 1:1, to a di-alkoxy aluminum salt in an inert solvent. The water may be added as such or diluted with alcohol. Half of this salt is then converted to basic aluminum compounds (HO)$_2$Al—X, which react as hereinbefore indicated with the other half of the di-alkoxy aluminum salt.

The polymeric basic aluminum salts of the present invention may be obtained upon completion of the reaction by distilling off the solvent (finally in vacuo). The liberated alcohol is recovered and may be converted to aluminum alcoholate again.

In the process according to the present invention no particular high temperatures are required as a rule; generally final temperatures of approximately 140–150° C. will do very satisfactorily.

The polymeric basic aluminum salts of the present invention are generally tough, resinous products, although sometimes they are true solids. As a rule, they dissolve readily in organic solvents such as benzene, toluene, xylene and petroleum oil fractions. The solutions formed are in general thin, non-gelatinous fluids.

Since the final polymeric products may often be advantageously employed in solution, it is frequently preferable not to isolate them but to work them up in solution. In many cases, solutions of 50% polymer content may be employed advantageously. Di- or poly-carboxylic acids as well as aromatic carboxylic acids generally yield solid, only slightly soluble polymers.

The novel polymeric basic aluminum salts of the present invention are valuable raw materials in the industrial arts. Many useful applications are available, particularly in the lacquer and paint industry and in the preparation of greases. The favorable properties of these novel polymeric products are based on their reactivity with respect to —OH compounds such as water, alcohols, enol-compounds, glycols, glycerin, acids, etc.

The manner in which the foregoing features of the invention are attained will appear more fully from the following detailed description thereof, in which reference is made to typical and preferred procedures in order to indicate more fully the nature of the invention, but without intending to limit the invention thereby.

Example 1

A mixture of 110.4 g. of oleic acid (0.4 mol) in 440 ml. of dry aromatic white spirits, this mixture being heated to 85° C., was added with stirring to a solution of 81.6 g. of aluminum isopropylate (0.4 mol) in 480 ml. of aromatic white spirits, this solution also being previously heated to 85° C. The reaction mixture was stirred for one hour at 95° C., whereupon 134 g. of powdered aluminum di-hydroxy-oleate (0.4 mol) was added to the aluminum di-isopropoxy-oleate solution thus obtained. The reaction mixture was now stirred for three hours at 95° C., whereupon it was heated to 140° C., while chiefly isopropanol distilled off. The solution was then boiled with reflux for one hour. After distillation of the solvent (finally in vacuo) 257 g. of polymer in the form of a plastic, transparent mass was obtained. By fractionation of the distilled solvent 68.4 g. (1.14 mols) of isopropanol were recovered, i.e. 95% of the quantity theoretically expected.

The aluminum content of the polymer obtained was 8.40%. The theoretical value, taking into account a molecular weight of 276 for the oleic acid used, is 8.49% for $[O=Al-X]_n$. A determination of the molecular weight of the product obtained by the cryoscopic method in benzene, gave an average value of approximately 15,000.

9.124 g. of the compound were hydrolyzed by boiling for six hours with a mixture of 1 g. water and 50 g. acetone, 9.448 g. of di-hydroxy aluminum oleate were obtained as a white powder. The polymer is readily soluble in hydrocarbons, but only slightly soluble in acetone and dioxane with which it can be precipitated from solutions in hydrocarbons as a plastic mass.

Example 2

A solution of 67 g. stearic acid (0.25 mol) in 225 ml. dry xylene, this solution being heated to 85° C., was added with stirring to a solution of 51 g. aluminum isopropylate (0.25 mol) in 225 ml. dry xylene, the latter solution also being previously heated to 85° C. The reaction mixture was stirred for one hour at 95° C. whereupon a mixture of 4.5 g. water (0.25 mol) and 10 ml. isopropanol was added to half of the aluminum di-isopropoxy-stearate solution thus obtained. The reaction mixture, containing 0.125 mol of aluminum di-hydroxy-stearate, was now stirred for one hour at 95° C., whereupon the other half of the aluminum di-isopropoxy-stearate solution was added.

After being stirred for half an hour at 95° C., the reaction mixture was heated with reflux until its temperature was 140° C., isopropanol-xylene distilling. After the solution had boiled with reflux for one hour the solvent was distilled off, the remainder in vacuo. 79 g. of polymer was obtained. From the distillate almost the theoretical quantity of isopropanol could be recovered.

The polymer obtained had practically the same appearance as the corresponding oleate described in Example 1, but the consistency was somewhat firmer. The aluminum content was 8.64% (theoretically it is 8.74%).

For the average molecular weight approximately 18,000 was found. The polymeric stearate has solubility properties analogous to those of the polymeric oleate.

Example 3

A solution of 107 g. stearic acid (0.4 mol) in 220 ml. dry xylene, this solution being heated to 85° C., was added with stirring to a solution of 98.4 g. aluminum sec. butylate (0.4 mol) in 240 ml. dry xylene, the latter solution also being previously heated to 85° C. The reaction mixture was stirred for one hour at 95° C. whereupon a solution of 131 g. of aluminum di-hydroxy-stearate (0.4 mol) in 520 ml. dry xylene was added to the aluminum di-sec. butoxy stearate solution thus obtained. The reaction mixture was now stirred for 3 hours at 95° C. The solvent was then distilled off until the solution had a temperature of 140° C. It was boiled with reflux for one hour and the solvent was distilled off, the remainder in vacuo. 251 g. of polymer was obtained, having the same properties as that under Example 2. The aluminum content was 8.67% (theoretically 8.74%).

Example 4

A solution of 267 g. stearic acid (1 mol) in 550 ml. dry xylene, heated to 85° C., was added with stirring to a solution of 204 g. aluminum isopropylate (1 mol) in 600 ml. dry xylene, the latter solution also being previously heated to 85° C. The reaction mixture was stirred for one hour at 95° C., whereupon a mixture of 18 g. water (1 mol) and 18 ml. isopropanol was added to the solution of the aluminum di-isopropoxy-stearate formed.

The viscous reaction mass thus obtained was boiled with stirring and reflux for one hour, the viscosity of the solution gradually decreasing. Subsequently, the solution was heated with reflux until it had reached a temperature of 140° C. Chiefly isopropanol distilled.

After the solution had boiled with reflux for one hour the solvent was distilled off, the remainder in vacuo. 311 g. of polymer was obtained, having the same properties as that under Example 2. The aluminum content was 8.65% (theoretically 8.74%).

From the distillate 94% of the theoretical quantity of isopropanol could be recovered.

Example 5

The same method as described under Example 4 was employed, but using oleic acid, 323 g. of polymeric oleate were obtained from 204 g. aluminum isopropylate (1 mol), 276 g. oleic acid (1 mol) and 18 g. water (1 mol), the polymer having the same properties as that under Example 1.

Example 6

A mixture of 102 g. aluminum isopropylate (0.5 mol), 131 g. stearic acid (0.5 mol) and 155 g. of a mineral oil having a naphthlene basis with a viscosity of 49.69° E. at 20° C. was heated with stirring for one hour at 95° C., upon which 9 g. water, diluted with 20 g. isopropanol, was added at once. The temperature was maintained at 95° C. for another hour. The almost solid mass did not change. The temperature was then raised to 150° C. Isopronanol distilled off, the remainders were removed in vacuo. The reaction product was a thick fluid at higher temperatures; at room temperature it had a butter-like consistency. Its weight was 315 g.

This mixture of polymeric stearate and an equal quantity of mineral oil was a suitable raw material for the preparation of a grease, which can be readily obtained by heating a mineral oil with a few percent of the mixture while adding stearic acid.

The grease obtained had the same properties as one obtained in an analogous way with the polymeric stearate of Example 2 (see Example 11 below).

Example 7

A solution of 88.5 g. naphthenic acid, acid number 158.7 (0.25 mol) in 170 g. dry xylene, was added with stirring at 90° C. to a solution of 51 g. aluminum isopropylate (0.25 mol) in 170 g. dry xylene.

The reaction mixture was heated for one hour at approximately 95° C., whereupon a mixture of 4.5 g. water and 20 g. isopropanol was added to half of the solution obtained. Heating at approximately 95° C. was continued for another hour, whereupon the other half of the di-isopropoxy aluminum naphthenate solution was added. Heating at approximately 95° C. was now continued for half an hour. Then the solvent was distilled off; in the beginning chiefly isopropanol distilled. The remainder of the xylene was removed in vacuo at 150° C.

The polymeric naphthenate obtained, 99 g., formed a light-brown, tough, transparent mass with an aluminum content of 6.80% (theoretically 6.82%). It was dissolved in 99 g. white spirit.

*Example 8*

A solution of 77.5 g. distilled tall oil (30% rosin acids) with an acid number of 181 (0.25 mol) in 175 g. dry xylene, was added at 85° C. with stirring to a solution of 51 g. aluminum isopropylate (0.25 mol) in 175 g. dry xylene.

The reaction mixture was heated at 90° C. for one hour whereupon a mixture of 4.5 g. water and 20 g. isopropanol was added, the temperature being raised to 95° C. and kept at 95° C. for one hour.

The solvent was then distilled off; in the beginning chiefly isopropanol distilled. The remainder of the xylene was removed in vacuo at 150° C.

There was obtained 90 g. polymeric tallate in the form of a light-brown, tough, transparent mass easily soluble in hydrocarbons. The aluminum content was 7.39% (theoretically 7.50%).

*Example 9*

In the same way as described in Example 7, a solution of 0.25 mol of di-isopropoxy aluminum naphthenate in 340 g. of dry xylene was prepared. It was mixed at 90° C. with a solution of 0.25 mol of di-hydroxy aluminum stearate in 390 g. dry xylene, which was prepared as indicated hereinbefore in Example 2.

The mixture was heated for half an hour at 95° C., whereupon the solvent was distilled off. The remainder of the xylene was removed in vacuo at 150° C.

180 g. of polymeric stearate-naphthenate was obtained as a tough, slightly brown mass. It was dissolved in 180 g. white spirit.

*Example 10*

A solution of 30.5 g. benzoic acid (0.25 mol) in 250 ml. dry xylene, heated to 95° C., was added with stirring to a solution of 51 g. aluminum isopropylate (0.25 mol) in 225 ml. dry xylene, the latter solution also being previously heated to 85° C. The mixture was stirred for one hour at 95° C., whereupon a mixture of 4.5 g. water (0.25 mol) and 10 ml. isopropanol was added to half of the solution of aluminum di-isopropoxy-benzoate thus obtained. The mass was very thick in the beginning, but after being heated for some time at 95° C. it became a thin liquid again. This solution, which contained 0.125 mol of aluminum di-hydroxy-benzoate, was stirred for one hour at 95° C. The other half of the aluminum di-isopropoxy-benzoate solution was subsequently added. After being stirred for half an hour at 95° C., the reaction mixture was heated under reflux until its temperature was 140° C., isopropanol-xylene distilling over. After the liquid, which contained a precipitate, had boiled with reflux for one hour, the solvent was distilled off; the remainder in vacuo; 42 g. of a solid, white polymer only slightly soluble in hydrocarbons was obtained. The aluminum content was 16.40% (theoretically 16.46%).

*Example 11*

A suitable grease may be prepared as follows: 40 g. of the polymeric stearate obtained as described above under Example 2 and 40 g. stearic acid were mixed with 920 g. spindle oil AR (Gulf). The mixture was heated with stirring at 160° C. and kept at that temperature for one hour. During heating a clear solution was obtained at approximately 60° C.; at approximately 130° C. this solution was becoming much more viscous. After being heated at 160° C. for one hour the thick liquid was slowly cooled to room temperature (this took 6 hours).

The resulting product was a clear grease having excellent lubricating properties.

*Example 12*

41.0 g. of pure di-isopropoxy aluminum stearate (0.1 mol) were intimately mixed with 32.6 g. of pure di-hydroxy aluminum stearate (0.1 mol) in a mortar. The mixture was put into a distilling flask and heated in vacuo in an oil-bath, while the temperature of the mass was raised to 195° C. during 4 hours. This temperature was maintained during one hour. The reaction-mass sintered, while isopropylalcohol escaped. After cooling, the weight of the polymer was 60.8 g. (theoretically 61.6 g.) and it had the same consistency and properties as the final product, described in Example 2.

The aluminum content was 8.85% (theoretically 8.74%).

*Example 13*

A solution of 39.2 g. of dry nonanic acid (0.25 mol) in 250 ml. of dry xylene, heated to 80° C., was added with stirring to a solution of 51.0 g. of aluminum-isopropylate (0.25 mol) in 300 ml. of dry xylene, heated to 80° C. After having stirred for one hour at 85° C., 81.5 g. of powdered dihydroxy aluminum stearate (0.25 mol) was added to the solution obtained of di-isopropoxy aluminum nonoate. The reaction mixture was stirred during 1½ hour at 95° C. and thereafter heated till the solution had reached a temperature of 140° C., while distilling substantially isopropanol. Subsequently, the mixture was boiled with reflux during one hour. After distilling the solvent (the remainder in vacuo) 127.1 g. of polymer was obtained (theoretically 126.7 g.). The aluminum content of the polymer, a yellow-brown, plastic, transparent mass, was 10.61% (theoretically 10.65%). The distillate contained upwards of 95% of the theoretically possible quantity of isopropanol.

What is claimed is:

1. A process for the preparation of polymeric basic aluminum compounds of organic acids of the general formula:

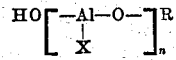

which comprises reacting a quantity of a basic aluminum salt having the formula $(HO)_2Al-X$ with an equimolar amount of an aluminum salt having the formula $(RO)_2Al-X$ at elevated temperatures while distilling off alcohol ROH formed in the reaction, wherein X stands for a carboxylic acid radical, $n$ is a large whole number, and R stands for an alkyl radical having from 1 to 10 carbon atoms.

2. A process for the preparation of polymeric basic aluminum compounds of organic acids of the general formula:

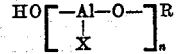

which comprises reacting under anhydrous conditions in an inert organic solvent a quantity of a basic aluminum salt having the formula $(HO)_2Al-X$ with an equimolar amount of an aluminum salt having the formula $(RO)_2Al-X$ at elevated temperatures while distilling off alcohol ROH formed in the reaction and solvent, wherein X stands for a carboxylic acid radical, $n$ is a large whole number, and R stands for an alkyl radical having from 1 to 10 carbon atoms.

3. A process for the preparation of polymeric basic aluminum compounds of organic acids of the general formula:

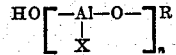

which comprises reacting under anhydrous conditions a quantity of an aluminum alkoxide having the formula $Al(OR)_3$ with an equimolar amount of an anhydrous carboxylic acid, effecting said reaction at elevated temperatures, adding to the reaction product an equimolar amount of water and heating the resulting reaction mixture at elevated temperatures while distilling off alcohol ROH formed in the reaction, wherein X stands for a carboxylic acid radical, $n$ is a large whole number, and R stands for an alkyl radical having from 1 to 10 carbon atoms.

4. A process for the preparation of polymeric basic aluminum compounds of organic acids of the general formula:

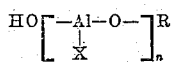

which comprises reacting under anhydrous conditions in an inert organic solvent a quantity of aluminum isopropoxide with an equimolar amount of an anhydrous carboxylic acid, effecting said reaction at elevated temperatures, adding to the reaction product an equimolar amount of water, heating the resulting reaction mixture at elevated temperatures while distilling off isopropyl alcohol formed in the reaction and solvent, wherein X stands for a carboxylic acid radical, $n$ is a large whole number, and R stands for an isopropyl radical.

5. A process for the preparation of polymeric basic aluminum compounds of organic acids of the general formula:

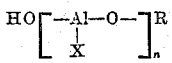

which comprises reacting under anhydrous conditions in an indifferent organic solvent a quantity of aluminum isopropoxide with an equimolar amount of an anhydrous aliphatic monocarboxylic acid, effecting said reaction at elevated temperatures, adding to the reaction product an equimolar amount of water, heating the resulting reaction mixture at elevated temperatures while distilling off isopropyl alcohol formed in the reaction and solvent, wherein X stands for an aliphatic monocarboxylic acid radical, $n$ is a large whole number, and R stands for an isopropyl radical.

6. A process for the preparation of polymeric basic aluminum stearate, which comprises reacting under anhydrous conditions in xylene one molar equivalent of aluminum isopoxide with one molar equivalent of anhydrous stearic acid at temperatures ranging from about 85° C.–95° C. for about 1 hour, adding to the reaction product one molar equivalent of water, heating the reaction mixture for about 1 hour at about 95° C. under reflux and subsequently at temperatures ranging from about 95° C.–140° C. while distilling off isopropylalcohol formed in the reaction and part of xylene, refluxing the resulting solution for about 1 hour at about 140° C., distilling off the remainder of xylene, finally under vacuum, and then recovering the resulting polymeric aluminum product.

7. A process for the preparation of polymeric basic aluminum oleate, which comprises reacting under anhydrous conditions in xylene one molar equivalent of aluminum isopoxide with one molar equivalent of anhydrous oleic acid at temperatures ranging from about 85° C.–95° C. for about 1 hour, adding to the reaction product one molar equivalent of water, heating the reaction mixture for about 1 hour at about 95° C. under reflux and subsequently at temperatures ranging from about 95° C.–140° C. while distilling off isopropylalcohol formed in the reaction and part of xylene, refluxing for about 1 hour at about 140° C., distilling off the remainder of xylene, finally under vacuum, and recovering the resulting polymeric aluminum compound.

8. A process for the preparation of polymeric basic aluminum naphthenate, which comprises reacting under anhydrous conditions in xylene equimolar quantities of aluminum isopropoxide and naphthenic acid at temperatures ranging from about 90° C.–95° C. for about 1 hour, adding to half of the resulting solution an equimolar quantity of water, refluxing this mixture and the other half of said solution separately at about 95° C. for about 1 hour, combining them, heating the combined mixture for about ½ hour at about 95° C. under reflux and subsequently at temperatures ranging from about 95° C.–150° C. while distilling off isopropylalcohol formed in the reaction and xylene, the remainder of the latter under vacuum, and then recovering the resulting polymeric aluminum compound.

9. A process for the preparation of a polymeric basic aluminum salt of tall oil acids, which comprises reacting under anhydrous conditions in xylene equimolar quantities of aluminum isopropoxide with anhydrous tall oil acids at temperatures ranging from about 85° C.–90° C. for about 1 hour, adding to the reaction product an equimolar quantity of water, heating the resulting reaction mixture for about 1 hour at about 95° C. with reflux and subsequently at temperatures ranging from about 95° C.–150° C. while distilling off isopropylalcohol formed in the reaction and xylene, the remainder of the latter under vacuum, and recovering the resulting polymeric aluminum product.

10. A process for the preparation of polymeric basic aluminum benzoate, which comprises reacting under anhydrous conditions in xylene one molar equivalent of aluminum isopropoxide with one molar equivalent of anhydrous benzoic acid at temperatures ranging from about 85° C.–95° C. for about 1 hour, adding to half of the resulting solution one molar equivalent of water, refluxing this mixture and heating the other half of said solution separately for about 1 hour at 95° C., combining them, heating the combined mixture for about ½ hour with reflux at about 95° C., subsequently at temperatures ranging from about 95° C.–140° C. while distilling off isopropylalcohol formed in the reaction and part of xylene, refluxing the resulting reaction mixture for about 1 hour at about 140° C., distilling off the remainder of xylene, finally under vacuum, then recovering the resulting polymeric aluminum product.

References Cited in the file of this patent

UNITED STATES PATENTS 2,744,074   Theobold _____ May 1, 1956

OTHER REFERENCES

Gray et al.: J. Physical and Colloidal Chem., vol. 53, 1949, pp. 23–38.

Parry et al.: Trans. Faraday Society, vol. 46, 1950, pp. 305–10, Eigenberger, Fette und Seifen, July 1942, Heft 7, pp. 505–508.